United States Patent
Tsutsui et al.

[11] Patent Number: 5,812,929
[45] Date of Patent: Sep. 22, 1998

[54] BIDIRECTIONAL CABLE TELEVISION SYSTEM, CABLE TELEVISION DISTRIBUTING DEVICE AND PROCESSING TERMINAL DEVICE

[75] Inventors: Seiji Tsutsui; Shigeru Oizumi; Tomoyoshi Suzuki, all of Kawasaki, Japan

[73] Assignee: Fujitsu Limited, Kawasaki, Japan

[21] Appl. No.: 673,323

[22] Filed: Jun. 28, 1996

[30] Foreign Application Priority Data

Jun. 30, 1995  [JP]  Japan .................................. 7-164385

[51] Int. Cl.$^6$ ........................................ H04N 7/173
[52] U.S. Cl. ........................ 455/5.1; 455/6.2; 348/10; 348/12
[58] Field of Search ............. 348/6, 7, 12, 13, 348/10, 564, 563, 589, 384, 385; 455/5.1, 6.1, 6.2, 6.3, 4.2; 345/327; H04N 7/16, 7/173

[56] References Cited

U.S. PATENT DOCUMENTS

| | | | |
|---|---|---|---|
| 5,506,628 | 4/1996 | Chun | 348/567 |
| 5,585,838 | 12/1996 | Lawler et al. | 348/906 |
| 5,600,364 | 2/1997 | Hendricks et al. | 348/6 |
| 5,652,628 | 7/1997 | Tosyoshima et al. | 348/569 |

FOREIGN PATENT DOCUMENTS

| | | |
|---|---|---|
| 4-84589 | 3/1992 | Japan . |
| 6-188847 | 7/1994 | Japan . |
| 6-217271 | 8/1994 | Japan . |
| 6-351019 | 12/1994 | Japan . |

OTHER PUBLICATIONS

English language Abstract & Japanese Patent Application No. 06–217271, Aug. 05, 1994, Method and Device for Data Transmission, Osamu Yoshida.

English language Abstract & Japanese Patent Application No. 04–84589, Mar. 17, 1992, Multiple Picture Synthesizer, Toshiki Shiraishi.

*Primary Examiner*—Chris Grant
*Attorney, Agent, or Firm*—Staas & Halsey

[57] ABSTRACT

A bidirectional cable television ("CATV") system includes a CATV distributing device which transmits information through each of a plurality of channels. The information includes video information and added information relating to the content of the video information. A TV receiver then displays the video information that is transmitted from the CATV distributing device, and a processing terminal device compiles a picture that can be displayed on a monitor TV. The picture is compiled from the video information and added information that are sent from the CATV distributing device. The CATV distributing device includes a communication unit that transmits the video information and added information through each of the plurality of channel. The processing terminal device includes a communication unit that receives the video information and added information from the CATV distributing device, and a picture that is displayed on a monitor TV. The picture is displayed by dividing a single image field into a plurality of image regions and inserting the video information and added information which are made to correspond, mutually, in one of the image regions.

11 Claims, 9 Drawing Sheets

FIG. 10

| VIDEO OF CHANNEL 1 | VIDEO OF CHANNEL 2 | VIDEO OF CHANNEL 3 | VIDEO OF CHANNEL 4 |
|---|---|---|---|
| VIDEO OF CHANNEL 5 | VIDEO OF CHANNEL 6 | VIDEO OF CHANNEL 7 | VIDEO OF CHANNEL 8 |
| VIDEO OF CHANNEL 9 | VIDEO OF CHANNEL 10 | VIDEO OF CHANNEL 11 | VIDEO OF CHANNEL 12 |
| VIDEO OF CHANNEL 13 | VIDEO OF CHANNEL 14 | VIDEO OF CHANNEL 15 | VIDEO OF CHANNEL 16 |

BIDIRECTIONAL CABLE TELEVISION SYSTEM, CABLE TELEVISION DISTRIBUTING DEVICE AND PROCESSING TERMINAL DEVICE

BACKGROUND OF THE INVENTION

1. Field of the Invention

The present invention relates to a bidirectional cable television system, cable television distributing device and processing terminal device.

2. Description of the Related Art

A cable television (CATV: community antenna television; cable television) system is constituted of a cable television (CATV) distributing device at the CATV center side, a television (TV) receiver at the subscriber side, and a wide-bandwidth transmission path connecting the CATV center and subscribers. A CATV distributing device supplies to the TV receivers of subscribers multi-channel video information sourced from ground waves, satellite broadcasts and communication satellite broadcasts etc. The wide-bandwidth transmission path is constituted of coaxial cable or optical fibre etc.

Selecting the desired channel was achieved by the subscriber changing over the channels on the TV receiver one by one whilst checking the video information on each channel.

However, a CATV distributing device provides video information for a large number of channels. The operation of performing channel section by changing over the channels of the TV receiver one by one whilst checking for the desired channel by the subscriber is therefore very burdensome on the subscriber.

Accordingly, the CATV distributing device in a conventional CATV system transmits to a TV receiver at the subscriber side multichannel video information in which is inserted video information of a plurality of channels that can be displayed on the screen. This multichannel video information is displayed on a single screen by the subscriber's TV receiver. The subscriber can therefore select the desired channel by referring to the multichannel video information of a plurality of channels. FIG. 10 is an example of the display screen of a TV receiver displaying multichannel video information of a number of channels. In this instance, the TV receiver displays a video picture of 16 channels from channel 1 to channel 16.

However, there were the following problems in simple display of multichannel video information as with the prior art CATV system. (1) If a large number of items of similar video information are present on the display screen, the subscriber cannot ascertain the desired channel simply from the multichannel video information. (2) In particular, when a subscriber is trying to select a channel without having particularly made up his mind what he wants to watch the information presented for selection is insufficient so the subscriber cannot select the desired channel simply on the basis of the video information displayed on the screen.

SUMMARY OF THE INVENTION

A first object of the present invention is to provide a bidirectional CATV system that is capable of transmitting video information from the CATV distributing device to a TV receiver and that is capable of transmitting added information (information relating to the content of the video information) to a subscriber's terminal processing device from the CATV distributing device, which can display the transmitted video information and added information on a monitor TV of the terminal processing device, and as a result enable a subscriber to easily select a desired channel by referring to the video information and added information that are displayed.

Also, a second object of the present invention is to provide a CATV distributing device wherein added information can be transmitted to a subscriber's terminal processing device from the CATV distributing device and wherein the video information that is transmitted can be changed over in response to selection by the subscriber.

Furthermore, a third object of the present invention is to provide a processing terminal device whereby added information (information relating to the content of the video information) can be displayed in addition to the multichannel video information, and wherein selected channel information that notifies the fact that a channel has been selected can be output to the CATV distributing device.

In order to achieve the first object, this bidirectional CATV system is equipped with a CATV distributing device that transmits through channel video information and added information relating to the content of this video information, a TV receiver that displays the added information sent from this CATV distributing device, and a processing terminal device that compiles a picture that can be displayed on a monitor TV from the video information and added information that are transmitted from the CATV distributing device.

The CATV distributing device comprises transmits the video information and the added information through channel.

The processing terminal device having a communication unit that receives video information and added information from the CATV distributing device and a picture information compilation unit that compiles a picture that can be displayed on the monitor TV by dividing a single image field to a plurality of image regions and inserting the items of video information and added information which are made correspond mutually in one of image regions.

It should be noted that, in this bidirectional CATV system, the CATV distributing device transmits added information through the control channel allocated to the CATV broadcast band whereby the video information is transmitted, and the communication unit of the processing terminal device is constructed such that it receives this added information through a control channel allocated in the CATV broadcast band whereby the video information is transmitted.

Also, in order to achieve the second object, the CATV distributing device of the present invention comprises a communication unit that transmits to the terminal processing device through each channel video information and added information relating to the content of this video information and that receives added information sent from the processing terminal device, and a selected video transmission control unit that, if the added information received by the communication unit is selected channel information for notifying the fact that a desired channel has been selected, changes over the video information transmitted to the TV receiver from the communication unit in accordance with the selected channel information.

The added information transmitted from the CATV distributing device of the present invention can be at least one item of information relating to video name, genre name, program name, screening time, screening channel, actors' names, TV station name and booking code.

Furthermore, the processing terminal device of the present invention comprises: a communication unit that receives the video information and added information from the CATV distributing device transmits through each of the channels video information together with added information relating to the content of this video information, a picture information compiling unit that compiles a picture that can be displayed on a monitor TV by dividing a single image field to a plurality of image regions and inserting the video information and added information which are made correspond mutually in one of the image regions, and a selected channel information transmission unit that transmits to the CATV distributing device as added information through the communication unit selected channel information that gives notification for notifying the fact that a desired channel has been selected.

The picture information compilation unit of the processing terminal device of the present invention may be constituted such as to compile a multichannel picture capable of displaying on a single screen video information and added information of a plurality of channels by associating video information and added information of respective channels and inserting these into a plurality of picture regions into which a single picture is subdivided.

Other objects and advantages of the present invention will become apparent during the following discussion in conjunction with the accompanying drawings, in which:

BRIEF DESCRIPTION OF THE DRAWINGS

FIG. 10 is an example of a screen displaying multichannel video in a prior art CATV.

DESCRIPTION OF THE PREFERRED EMBODIMENTS

Embodiments of the present invention are described below with reference to the drawings.

First Embodiment

Figure 1:
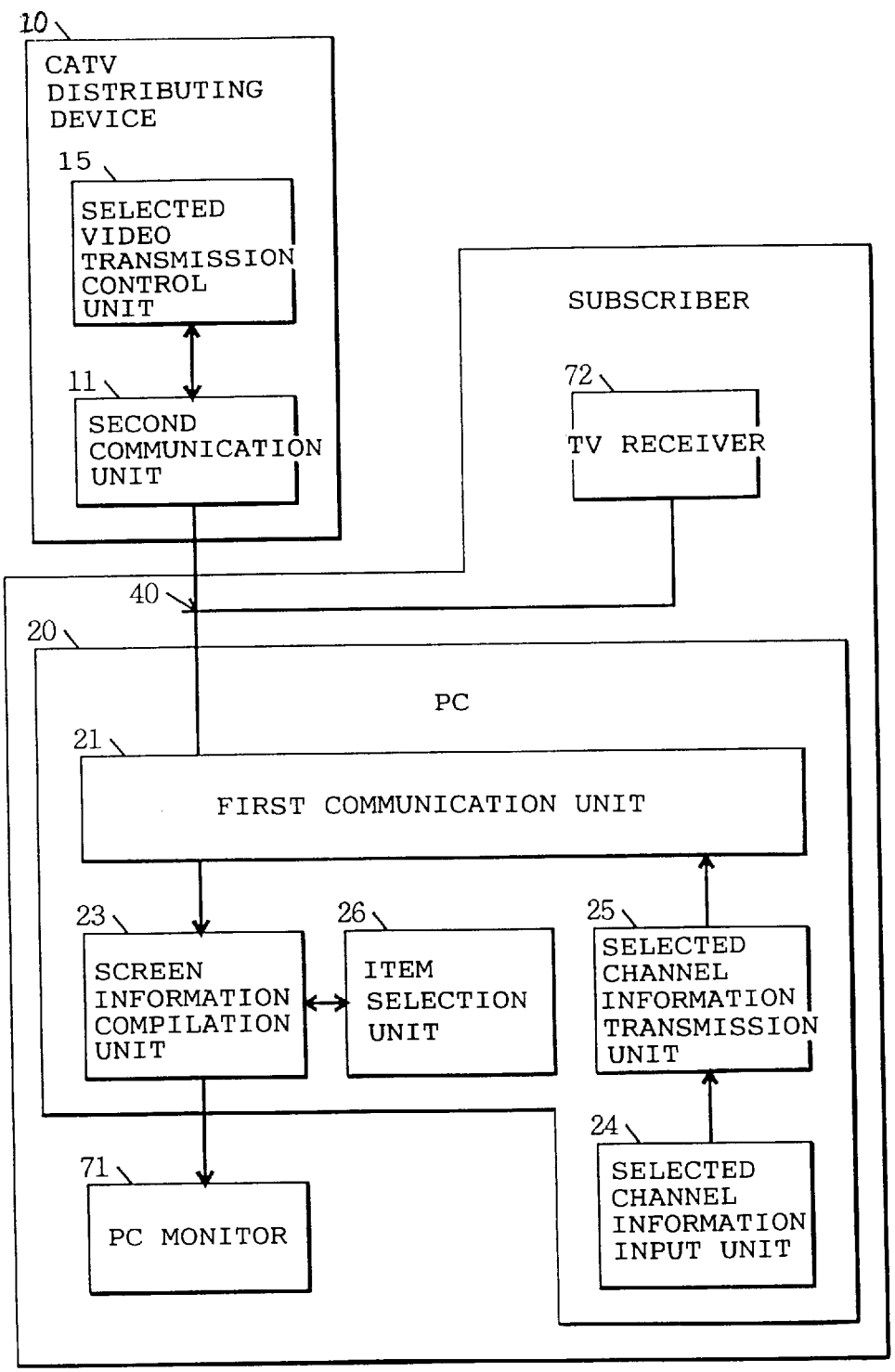
FIG. 1 is a layout block diagram of a bidirectional CATV system according to a first embodiment of the present invention.

FIG. 1 is a layout block diagram of a bidirectional CATV system according to a first embodiment of the present invention.

The bidirectional CATV system comprises a CATV distributing device 10, TV receiver 72 and processing terminal device (PC) 20.

CATV distributing device 10 and PC 20 are connected by means of optical fibre cable (optical cable) 40. CATV distributing device 10 and TV receiver 72 are likewise connected through optical cable 40.

CATV distributing device 10 comprises a second communication unit 11 and selected video transmission control unit 15. Second communication unit 11 sends a plurality of items of video information through each channel to PC 20 or TV receiver 72. Also, second communication unit 11 sends information for channel selection as added information to PC 20. The information for channel selection is content information of a plurality of items displaying the specific content of the video information of each channel. The plurality of items of content information may be video name, genre name, program name, screening time, screening channel, actors' names, TV station name, or booking code etc. Also, second communication unit 11 receives added information transmitted from PC 20. Also, if the added information received from PC 20 is selected channel information, second communication unit 11 communicates this selected channel information to selected video transmission control unit 15.

In accordance with the added information (selected channel information) that is communicated to it from second communication unit 11, selected video transmission control unit 15 changes over the video information that is transmitted to the TV receiver 72 through the currently specified channel (specified frequency band) to the selected channel video information. The "selected channel information" means information for notification to CATV distributing device 10 designating the channel that the subscriber wishes to be displayed on TV receiver 72.

TV receiver 72 displays the video information transmitted from CATV distributing device 10. If the channel of TV receiver 72 is set to a specific channel (specific frequency band), video information switched by selected video transmission control unit 15 in response to the selected channel information can be displayed. However, it should be noted that the subscriber can also change over the video information displayed on TV receiver 72 by himself switching the channel of TV receiver 72.

PC 20 is a personal computer. PC 20 comprises a first communication unit 21, screen information compilation unit 23, selected channel information input unit 24, selected channel information transmission unit 25, and item selection unit 26.

First communication unit 21 receives video information and added information transmitted from second communication unit 11. Also, first communication unit 21 transmits received video information and added information to picture information compilation unit 23. Also, first communication unit 21 transmits to second communication unit 11 added information (selected channel information) notified to it from selected channel information transmission unit 25.

picture information compilation unit 23 inserts the items of video information and added information communicated to it from first communication unit 21 in respective mutual correspondence in picture regions obtained by subdivision of a single screen into a plurality of regions, thereby compiling a multichannel picture wherein the video information and added information of a plurality of channels are displayed on a single screen. The video information is inserted in video information display regions of the picture regions. Also, picture information compilation unit 23 comprises an information table in which is stored the added information for each channel. A plurality of items of content information contained in the added information communicated from the first communication unit 21 are stored in sequence in this information table. Picture information compilation unit 23 is capable of reading only the content information of the item selected, or is capable of reading the content information of each item in its order of storage, or is capable of reading the content information of a plurality of items at once. Picture information compilation unit 23 inserts the content information of each item read from the information table in the added information display region of the corresponding channel. It should be noted that, when the content information of a plurality of items has been read at once, picture information compilation unit 23 compiles a menu display picture in which the content information of these plurality of items is inserted.

71 is a PC monitor that displays the menu display picture and multichannel picture compiled by picture information compilation unit 23. It should be noted that the menu picture is displayed superimposed on the added information regions of the corresponding video information in the multichannel picture. Item selection unit 26 selects a desired item whose content information is to be displayed in the added information display region in the multichannel picture, from all the items in the menu display region. The content information of the selected item is read from the information table of picture information compilation unit 23 and inserted into the added information display region of the corresponding channel, being thereby compiled as a multichannel picture. In this case, the menu display picture is deleted from the PC monitor 71.

Selected channel information input unit 24 inputs data for selection of a desired channel (for example, the channel number).

Selected channel information transmission unit 25 communicates, as selected channel information, the data input (channel number) from selected channel information input unit 24, to first communication unit 21.

It is to be assumed that PC 20 and TV receiver 72 belong to the same subscriber of the bidirectional CATV system.

Second communication unit 11 sends to PC 20 added information through a control channel which is allocated in the CATV broadcast band used for transmission of the video information. Also, first communication unit 21 transmits added information to CATV distributing device 10 through a control channel. It should be noted that the information content of the added information is much smaller than the information content of the video information. The bandwidth of the control channels can therefore be much narrower than the bandwidths of the video information channels.

Figure 2:
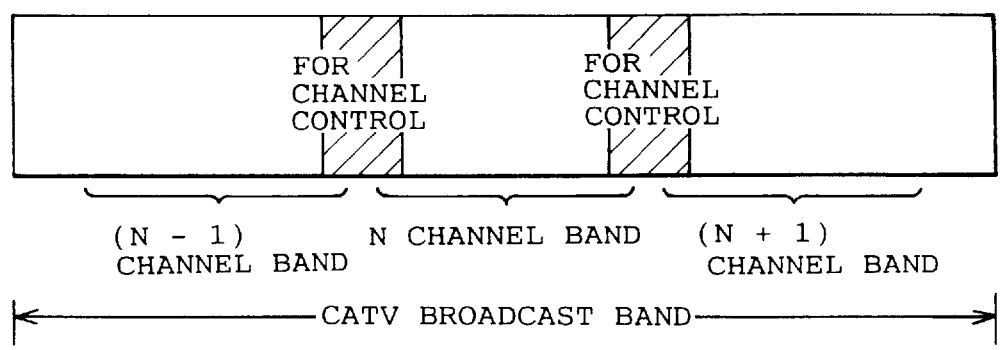
FIG. 2 is a diagram of a first system whereby control channels are allocated to a CATV broadcast band.

FIG. 2 is a diagram of a first system for allocation of control channels in the CATV broadcast band.

Figure 3:
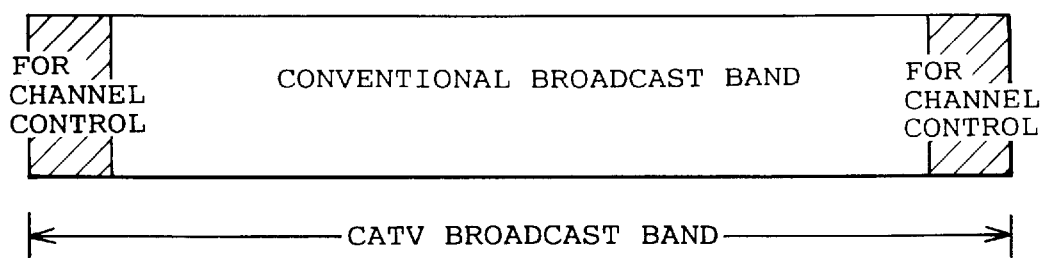
FIG. 3 is a diagram of a second system whereby control channels are allocated to a CATV broadcast band.

FIG. 3 is a diagram of a second system for the allocation of control channels in the CATV broadcast band.

In the first system, the control channels are allocated between adjacent channel bands. That is, a control channel is allocated to a band between the (N−1) channel band and N-channel band or to a band between the N−1 channel band and (N+1) channel band.

In the second system, the control channels are allocated to bands positioned at the bottom end and the top end of the CATV broadcast band.

Figure 4:
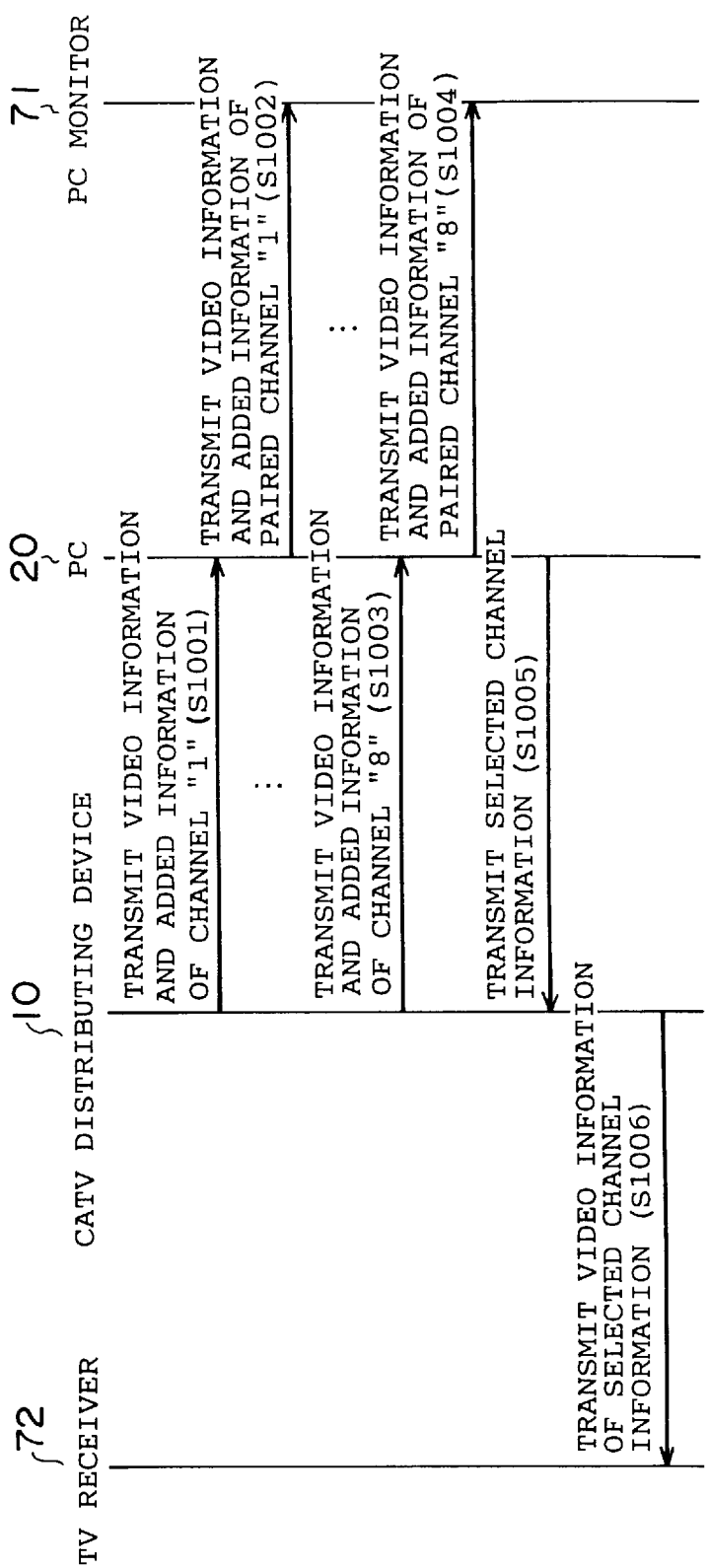
FIG. 4 is a sequence diagram given in explanation of the processing operation of the bidirectional CATV system as a whole.

FIG. 4 is a sequence diagram given in explanation of the processing operation of the bidirectional CATV system as a whole. The processing operation of the bidirectional CATV system as a whole will be described for the case where CATV distributing device 10 transmits video information and added information in an amount corresponding to eight channels divided into prescribed channel bands. In this case, will be assumed that video information that can be selected at will is transmitted through a specific channel to the TV receiver 72 from CATV distributing device 10.

First of all, CATV distributing device 10 transmits the video information and added information of channel "1" from second communication unit 11 to PC 20 (step 1001).

PC 20 receives the video information and added information of channel "1" by first communication unit 21 and compiles a display picture corresponding to channel "1" by means of display information compilation unit 23, and sends the compiled picture corresponding to channel "1" to PC monitor 71 (step 1002).

Next, CATV distributing device 10 transmits to PC 20 from second communication unit 11 the video information and added information of channel "2". As in the case of the processing of step 1002, PC 20 transmits a compiled picture corresponding to channel "2" to PC monitor 71. In this way, the processing of step 1001 to step 1002 is repeated, one channel at a time, up to channel "8" (step 1003 to step 1004). In this way, a multichannel picture consisting of the video information and added information corresponding to eight channels is displayed on a single screen by PC monitor 71. The subscriber can thus refer to the video information and added information corresponding to eight channels.

When the selected channel information from selected channel information input unit 24 has been input, PC 20 transmits this selected channel information as added information to CATV distributing device 10 (step 1005).

In accordance with the selected channel information notified to it by PC 20 and by means of selected video signal control unit 15, CATV distributing device 10 changes over the video information that is transmitted by the currently specified channel to the video information of the selected channel and sends this from second communication unit 11 to TV receiver 72 (step 1006).

With the construction of the first embodiment, in addition to the video information, the added information can be transmitted to the processing terminal device at the subscriber side and displayed on the monitor screen. The subscriber can therefore easily select a desired channel by referring to both the video information and added information.

Figure 5:
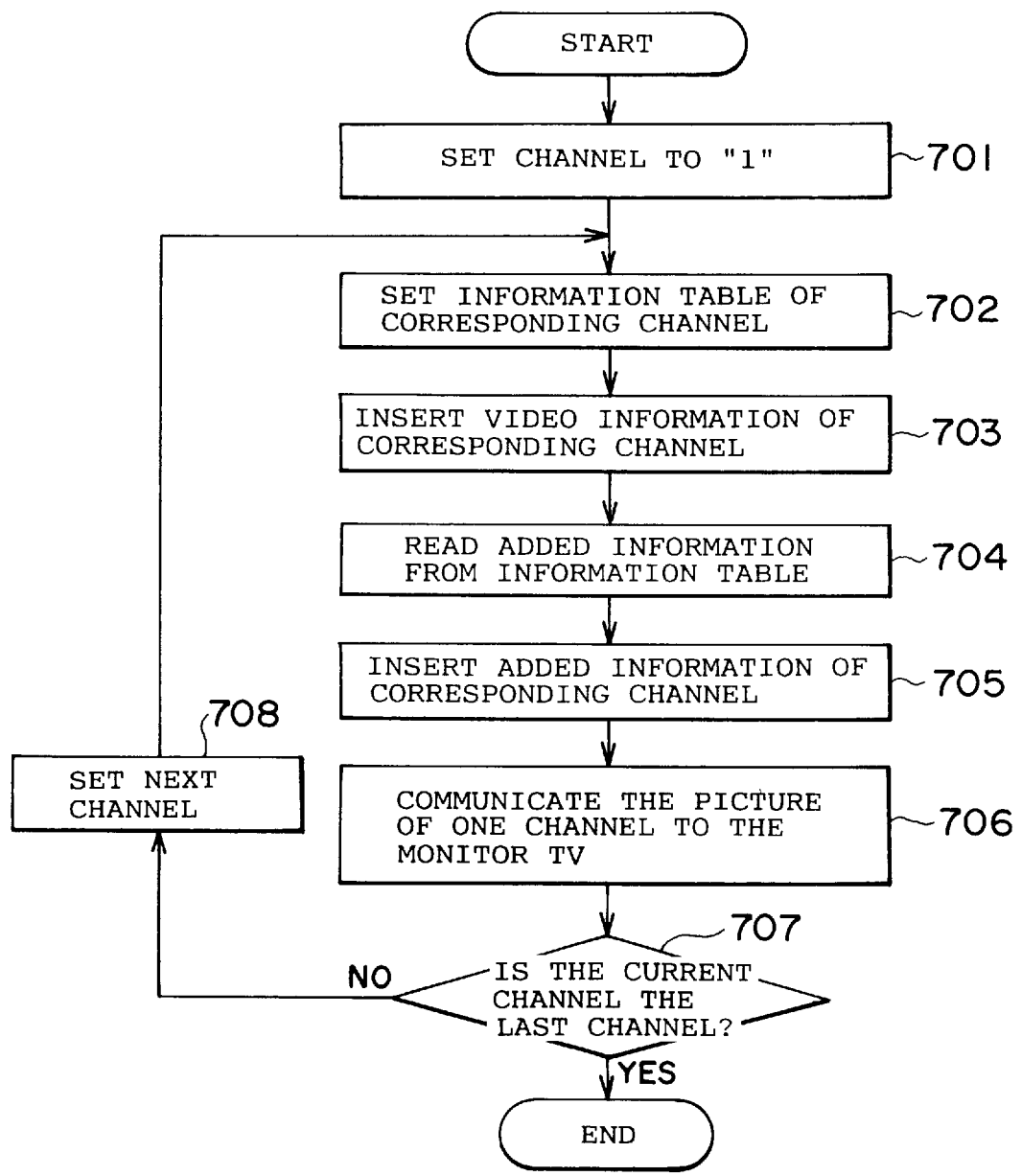
FIG. 5 is a flow chart of the compilation processing of the multichannel picture performed by the processing terminal device.

FIG. 5 is a flow chart of the compilation processing of the multichannel picture that is performed in PC 20. It is assumed that CATV distributing device 10 transmits to PC 20 video information and added information corresponding to eight channels, split into the prescribed channel bands. It is also assumed that first communication unit 21 communicates to picture information compilation unit 23 received video information and added information corresponding to eight channels. Additionally, it is assumed that picture information compilation unit 23 stores, separately for each item, the content information of a plurality of items included in the added information in the information table for each channel.

When processing starts, PC 20 sets the channel to "1" (step 701).

Next, PC 20 sets as processing object the information table of the channel that is currently set (step 702). For example, when processing commences, the information table of channel "1" will be sent in this step.

Next, PC 20 inserts the video information of the channel that has been set into the prescribed video information display region (step 703).

PC 20 gets the content information of a single item from the information table that has been set (step 704) and inserts this in the added information display region corresponding to the channel that has been set (step 705). By the processing of step 703 and step 705, a picture is compiled corresponding to one channel, in which the video information and added information are paired. PC 20 communicates this picture to PC monitor 71 (step 706). PC monitor 71 displays the picture that has been communicated.

Next, PC 20 decides whether the currently set channel is the last channel or not (in this case channel number "8") (step 707).

If in step 707 it is ascertained that the currently set channel "is not the last channel", PC 20 sets the next channel (step 708) and processing returns to step 702.

However, if, in the processing of step 707, it is ascertained that the currently set channel "is the last channel", the series of processes is terminated.

Figure 6:
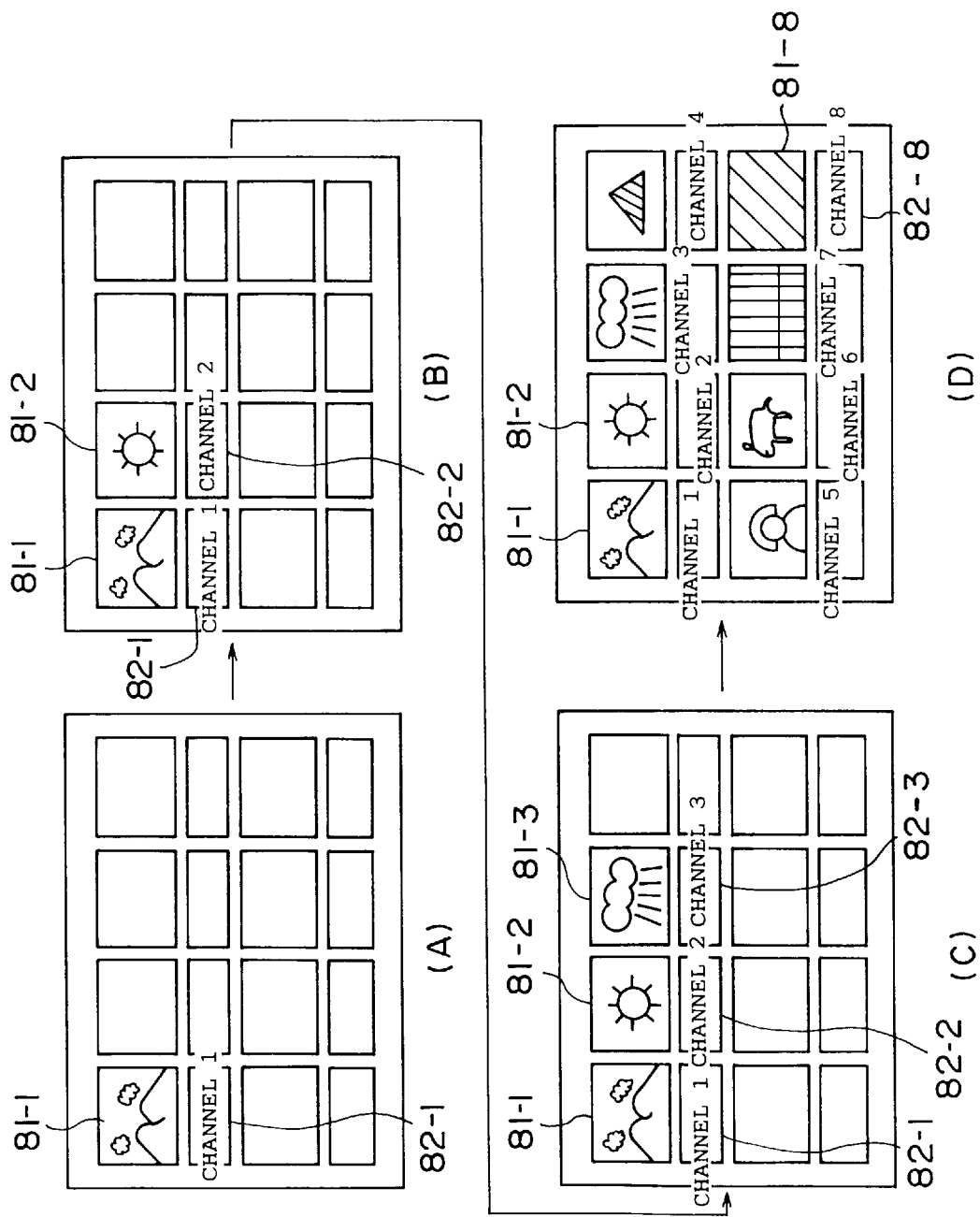
FIG. 6 is an example of the transformation of the screen displayed on a monitor TV of the processing terminal device when the video information and added information are displayed.

FIG. 6 shows the transformation of the screen displayed on PC monitor 71 when PC 20 has repeated the processing from step 702 to step 708 in FIG. 5. Specifically, FIG. 6(A) shows the condition when the video information 81-1 and added information 82-1 of channel "1" are displayed. And FIG. 6(B) shows the condition when the video information 81-1, 81-2 and added information 82-1, 82-2 of channels "1" to "2" is displayed. And FIG. 6(C) shows the condition when the video information 81-1, 81-2, 81-3 and added information 82-1, 82-2, 82-3 of channels "1" through "3" is displayed. Furthermore, FIG. 6(D) shows the condition when the video information 81-1, 81-2, . . . 81-8 and added information 82-1, 82-2, . . . 82-8 of channels "1" to "8" is displayed. It will be noted that, in FIG. 6, the video information of the "N" (N=1 to 8) channels is displayed in the video information display region and the added information of the "N" channels is displayed in the added information display region.

Figure 7:
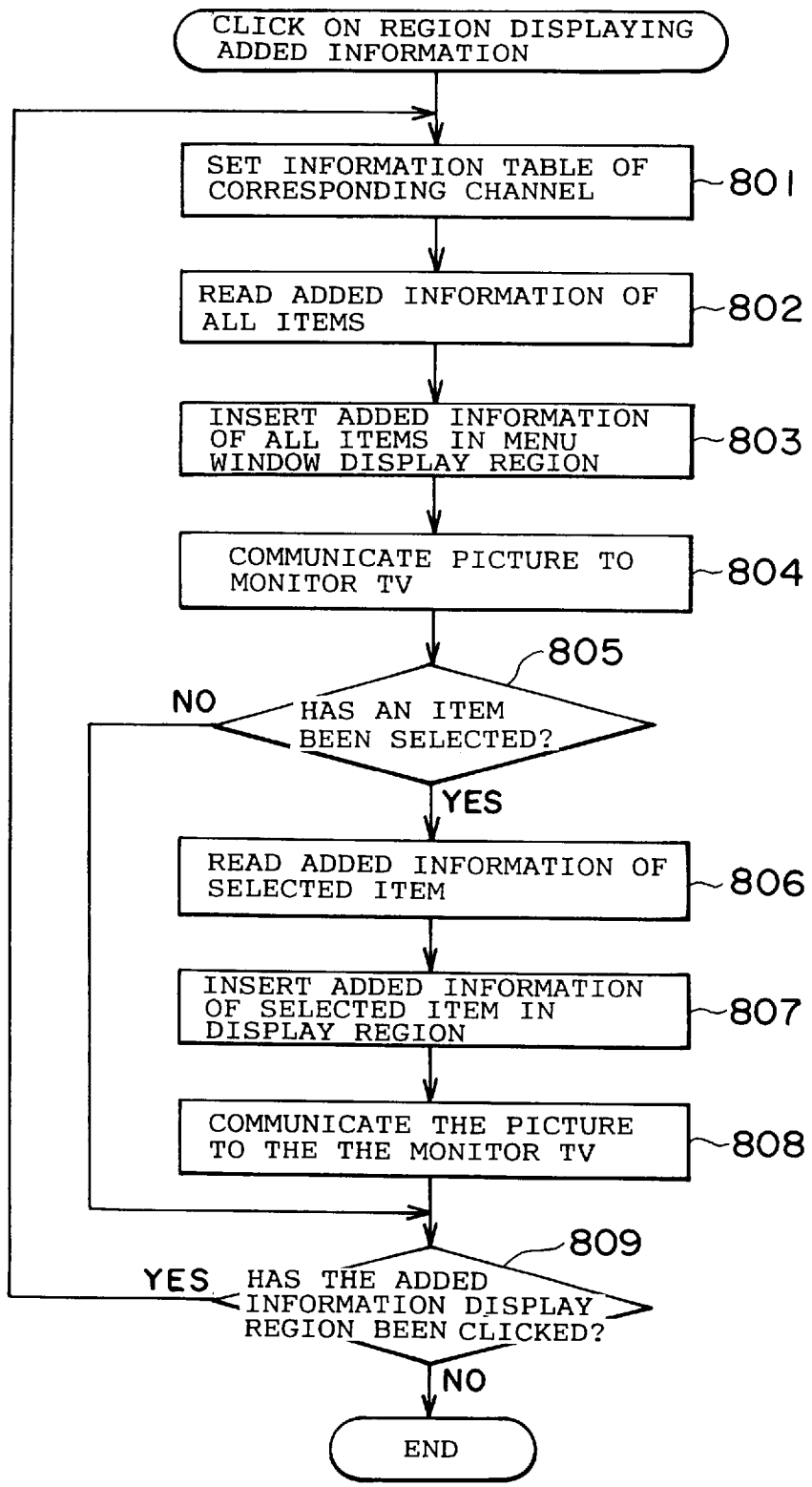
FIG. 7 is a flow chart of processing whereby the items displayed in an added information display region are altered.

FIG. 7 is a flow chart of the processing whereby the item displayed in the added information display region is altered. FIGS. 8(A)–8(D) collectively illustrate an example of the transformation of the screen when the item displayed in the added information display region is altered. The processing whereby the items displayed in the added information display region are altered will be explained with reference to FIG. 7 and FIGS. 8(A)–8(D). It will be assumed that PC monitor 71 displays the video information of each channel in the video information display region and displays the added information of each channel in the added information display region. Also, alteration of the content information of an item is achieved by displaying a plurality of items in a menu display, then selecting a desired item from among the items in the menu display region using item selection unit 26.

FIG. 8(A) shows the condition in which the video information 81-1 of channel "1" is displayed in the video information display region and the added information 82-1 is displayed in the added information display region. By operating a mouse, not shown, the subscriber moves cursor 83 displayed on PC monitor 71 into the added information display region of added information 82-1. The subscriber then effects a clicking action by pushing the push switch provided on the mouse. When the added information display region is clicked, the processing of FIG. 7 is started.

PC 20 sets as processing object the information table of the channel (in this case, channel "1") corresponding to added information 82-1 that has been clicked (step 801). Next, PC 20 reads all of the content information of the plurality of items stored in this information table (step 802). PC 20 compiles a menu display picture (step 803) by inserting the content information of all the items that have been read into the menu display region. PC 20 then communicates the menu display picture to PC monitor 71 (step 804).

FIG. 8(B) shows the condition when added information (content information of a plurality of items) 82-1 consisting of "channel 1", "program name", and "screening time" etc is displayed in the menu display region of PC monitor 71.

Figure 8:
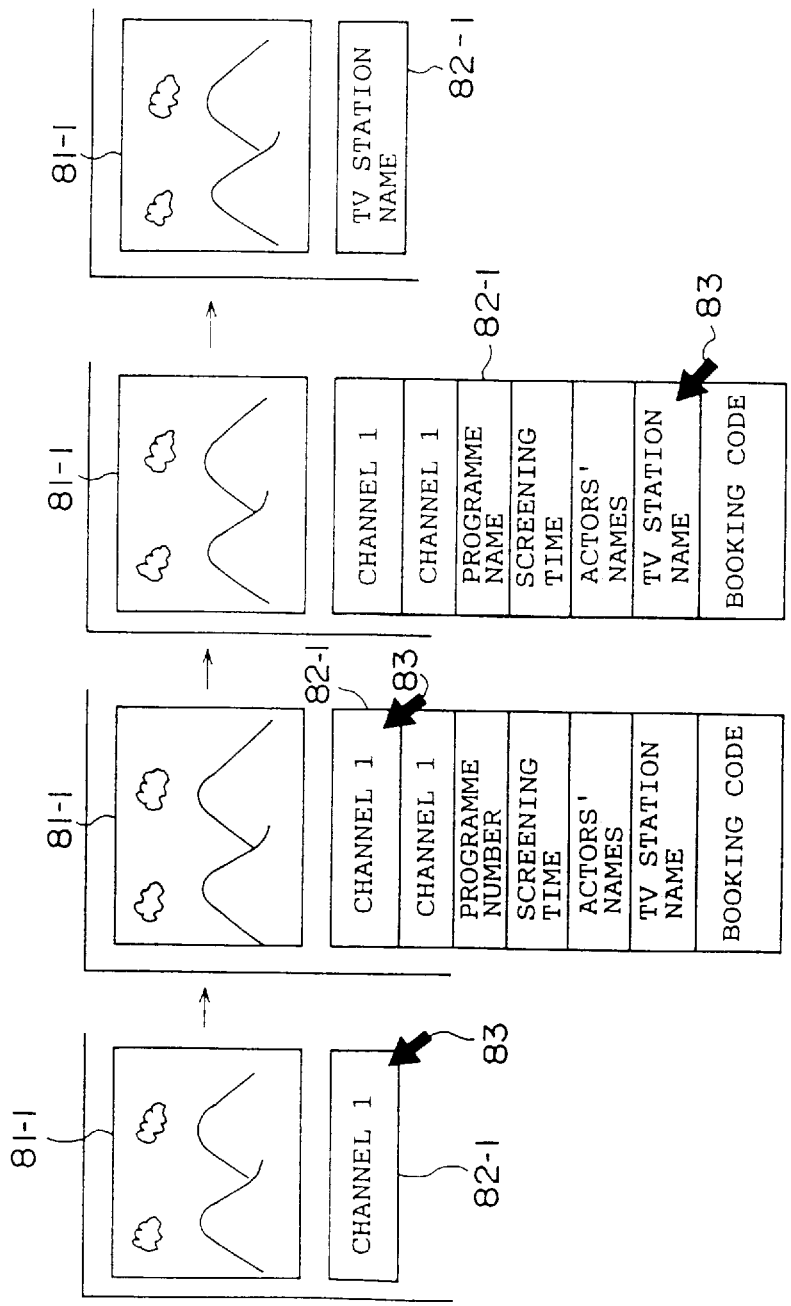
FIGS. 8(A)–8(D) collectively illustrate is an example of the transformation of the screen displayed on a monitor TV of a processing terminal device when added information is selected.

The subscriber moves the cursor 82 on to the desired item of the plurality of items displayed in menu fashion in FIG. 8(B) and clicks on this item. In this case, let us assume that the desired item was "TV station name". FIG. 8 (C) shows the condition in which cursor 83 has been moved on to the desired item "TV station name" of the plurality of items displayed in menu fashion.

When, in step 805, the desired item is clicked, PC 20 executes step 806. On the other hand, if a desired item is not clicked, the processing of step 809 is executed.

In step 806, PC 20, using item selection unit 26, reads the content information corresponding to the clicked item from the content information of the plurality of items stored in the information table of channel "1". PC 20 then compiles a multichannel picture by inserting the content information of this item in the added information display region (step 807). Next, PC 20 communicates the multichannel picture to PC monitor 71 (step 808).

When this happens, "TV station name" is displayed in the added information display region 82-1 of PC monitor 71 (FIG. 8(D)). It should be noted that, although in the case of the example shown, only one item is selected, it would also be possible to select a plurality of items. In this case, the plurality of items will be displayed in the added information display region.

Next, the case will be described wherein a desired channel is selected using selected channel information input unit 24 of PC 20. In this case, channel selection is performed by inputting the selected channel information. In this case, the "selected channel information" means the specific channel number, such as for example channel "2" or channel "5", etc. In this embodiment, "input of selected channel information" is achieved by operating the mouse. For example, the video information display region is clicked by moving the cursor displayed on PC monitor 71 by operating the mouse into the video information display region. When this is done, PC 20 identifies the channel number from the video display region that has been clicked, and communicates this to selected channel information transmission unit 25. Selected channel information transmission unit 25 transmits the selected channel information (channel number) as added information from first communication unit 11 to CATV distributing device 10.

Based on the selected channel information communicated to it from PC 20, CATV distributing device 10 uses selected video transmission control unit 15 to change over the video information that has been transmitted to TV receiver 72 from second communication unit 11 on the currently specified channel to video information of the selected channel.

With the construction of this first embodiment, aside from the video information, it is possible to transmit to the processing terminal device at the subscriber side added information, so that specific information such as the video name, or genre name etc can be displayed on the monitor screen. Consequently, the information that can be referred to becomes rich in that the subscriber can consult both the video information and the added information: the subscriber is therefore easily able to make a selection of a desired channel.

Also, with the construction of the first embodiment, channel selection was made easy by the fact that, if there were a plurality of items of added information, this plurality of items could be displayed.

Furthermore, with the construction of the first embodiment, even when the added information consists of a plurality of items, it is possible to display just the selected item, making the display of the desired item easy to view.

Second Embodiment

Figure 9:
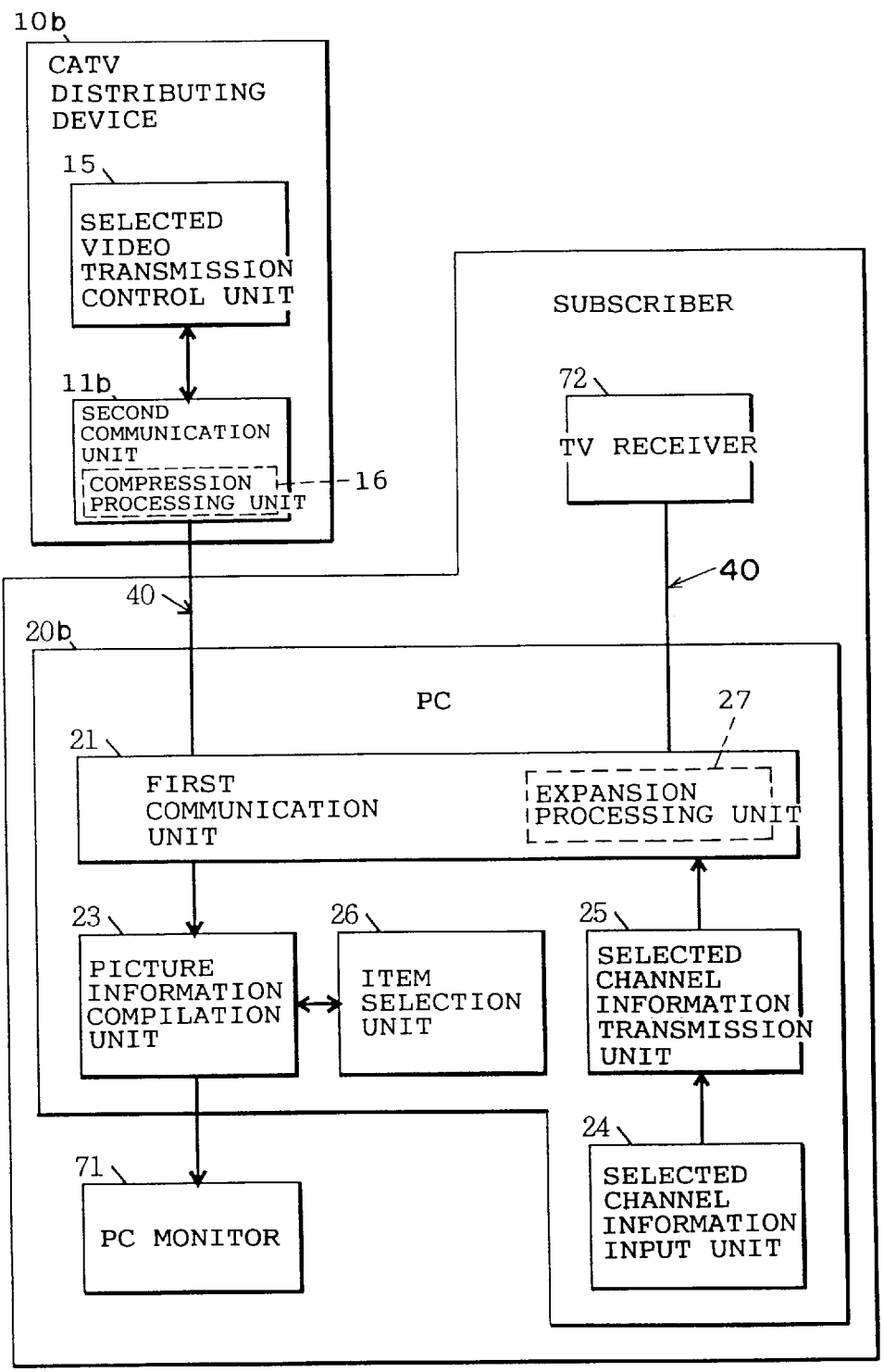
FIG. 9 is a layout block diagram of a bidirectional CATV system according to a second embodiment of the present invention.

FIG. 9 is a layout block diagram of a bidirectional CATV system according to a second embodiment of the present invention. In this second embodiment, there is added the function of transmitting the video information with data compression in addition to the functions of the CATV distributing device 10 of the first embodiment. Also, in this second embodiment, there is added a function of displaying the video information that has been subjected to data compression with data expansion, in addition to the functions of the PC 20 of the first embodiment. Items in FIG. 9 that have the same symbols as in FIG. 1 have the same function and detailed description of them is omitted.

The bidirectional CATV system comprises a CATV distributing device 10b, TV receiver 72 and processing terminal device (PC) 20b.

CATV distributing device 10b and PC 20b are connected through optical fibre cable (optical cable) 40. TV receiver 72 is connected to PC 20b through optical cable 40.

CATV distributing device 10b comprises a second communication unit 11b and selected video transmission control unit 15. The second communication unit 11b is provided with a compression processing unit 16 that performs data compression on the video information that is communicated to it from selected video transmission control unit 15. Second communication unit 11b transmits the video information that has been subjected to data compression to PC 20b together with added information.

PC 20b comprises a first communication unit 21b, picture information compilation unit 23, selected channel information input unit 24, selected channel information transmission unit 25 and item selection unit 26.

First communication unit 21b comprises an expansion processing unit 27 that subjects to data expansion the video information that has been compressed. First communication unit 21b communicates the received video information and added information to picture information compilation unit 23. First communication unit 21b, if the video information is transmitted to TV receiver 72, transmits the data-compressed video information after subjecting it to data expansion processing by expansion processing unit 27.

Picture information compilation unit 23 inserts the video information and added information notified to it from first communication unit 21 into the picture regions obtained by subdivision of a single picture into a plurality of regions, with the video information and added information of the respective channels in correspondence, thereby compiling a multichannel picture whereby the video information and added information of a plurality of channels can be displayed on a single screen.

However, in some cases, video information of more than 100 channels may be transmitted in the CATV broadcast band. If the video information of this many channels allocated to the CATV broadcast band is processed without data compression, a lot of time is needed to read the video information of a large number of channels. Consequently, the time for compilation of the multichannel picture by reading picture information becomes longer than the time required by the monitor TV to scan and display a single picture. Consequently, when the number of channels increases, the inconvenient situation arises that it becomes impossible to display a multichannel picture. However, with the picture information compilation unit 23 of the second embodiment, a multichannel picture can be compiled by reading the data-compressed video information in a short time, so a shorter processing time can be used than in the case of processing video information which has not been subjected to data compression. Thus, the second embodiment of the present invention can be applied to cases where video information of a number of channels exceeding 100 is transmitted to the CATV broadcast band.

It is apparent that, in this invention, a wide range of different working modes can be formed based on the invention without deviating from the spirit and scope of the invention. This invention is not restricted by its specific working modes except being limited by the appended claims.

What is claimed is:

1. A bidirectional CATV system, comprising:
   a CATV distributing device transmits video information and added information relating to the content of the video information through channel;
   a TV receiver that displays the video information transmitted from the CATV distributing device; and
   a processing terminal device having a communication unit that receives the video information and added information from the CATV distributing device and a picture information compilation unit that compiles a picture that is displayed on a monitor TV by dividing a single image field to a plurality of image regions and inserting the video information and added information which are made correspond mutually in one of the image regions.

2. A bidirectional CATV system according to claim 1, wherein
   said CATV distributing device transmits the added information through a control channel allocated in the CATV broadcast band on which the video information is transmitted, and
   said communication unit of the processing terminal device receives the added information through a control channel allocated in the CATV broadcast band on which the video information is transmitted.

3. A bidirectional CATV system according to claim 1, wherein
   said CATV distributing device transmits compressed video information,
   said picture information compilation unit of the processing terminal device compiles a picture that can be displayed on the monitor TV using the compressed video information, and
   said TV receiver displays the video information after expanding the compressed video information.

4. A bidirectional CATV system according to claim 3, wherein
   said CATV distributing device transmits the compressed video information and the added information through a control channel allocated in the CATV broadcast band on which the video information is transmitted.

5. A bidirectional CATV system according to claim 1, wherein said processing terminal device further has a selected channel information transmission unit that transmits selected channel information for notifying the fact that a desired channel has been selected to the CATV distributing device as the added information, and said CATV distributing device has a selected video transmission control unit that changes over, in accordance with the selected channel information, the video information that is transmitted to the TV receiver.

6. A bidirectional CATV system according to claim 5, wherein said communication unit of the processing terminal device transmits the added information through a control channel allocated in the CATV broadcast band on which the video information is transmitted, and said CATV distributing device receives the added information through a control channel allocated in the CATV broadcast band on which the video information is transmitted.

7. A processing terminal device comprising:

a communication unit that receives video information and added information relating to the content of this video information from a CATV distributing device that transmits the video information and the added information through channel;

a picture information compilation unit that compiles a picture that can be displayed on a monitor TV by dividing a single image field to a plurality of image regions and inserting the video information and added information which are made correspond mutually in one of the image regions; and a selected channel information transmission unit that transmits selected channel information for notifying the fact that a desired channel has been selected to the CATV distributing device as added information.

8. A processing terminal device according to claim 7, wherein said picture information compilation unit inserts video information and added information which are made correspond mutually in one of image regions obtained by dividing a single image field, thereby compiles a multichannel picture in which video information and added information of a plurality of channels can be displayed on one of the image regions.

9. A processing terminal device according to claim 8, wherein the added information consists of content information of a plurality of items, said picture information compilation unit compiles a multichannel picture by inserting the content information of one item, in one of the image regions, with it made correspondence with the video information.

10. A processing terminal device according to claim 8, further comprising:

an item selecting unit that notifies to the picture information compilation unit the selected item of content information among the plurality of items.

11. A processing terminal device according to claim 9, wherein said picture information compilation unit compiles a multichannel picture by inserting the content information of an item notified by the item selection unit, in one of the image regions, with it made correspondence with the video information.

* * * * *